United States Patent [19]

Noda

[11] Patent Number: 4,749,285
[45] Date of Patent: Jun. 7, 1988

[54] DRAG ADJUSTING DEVICE FOR A CLOSED FACE TYPE FISHING REEL

[75] Inventor: Hideo Noda, Sakai, Japan

[73] Assignee: Shimano Industrial Company Limited, Osaka, Japan

[21] Appl. No.: 941,420

[22] Filed: Dec. 15, 1986

[30] Foreign Application Priority Data

Dec. 27, 1985 [JP] Japan .................. 60-203562[U]

[51] Int. Cl.⁴ .............................................. A01K 89/02
[52] U.S. Cl. ..................... 242/84.5 A; 242/84.53; 242/84.2 A
[58] Field of Search ............. 242/84.5 P, 84.5 A, 242/84.51 A, 84.5 R, 84.53

[56] References Cited

U.S. PATENT DOCUMENTS

| | | | |
|---|---|---|---|
| 2,904,281 | 9/1959 | Jackson | 242/84.5 A |
| 2,988,298 | 6/1961 | Purneee | 242/84.53 |
| 4,323,203 | 4/1982 | Newfeed | 242/84.5 A |
| 4,591,108 | 5/1986 | Ban | 242/84.5 P |
| 4,634,073 | 1/1987 | Coquelet | 242/84.5 A |

OTHER PUBLICATIONS

Japan Laid-Open Gazette No. Sho 58-152,875 (no date).

*Primary Examiner*—Lenard A. Footland
*Attorney, Agent, or Firm*—Stevens, Davis, Miller & Mosher

[57] ABSTRACT

A drag adjusting device for a closed face type fishing reel including a reel body and a spool supported rotatably to the front thereof. A drag thumbscrew is provided for for setting an initial load of a drag brake member, and a drag lever is provided for adjusting in a predetermined range the initial load set by the drag thumbscrew.

5 Claims, 2 Drawing Sheets

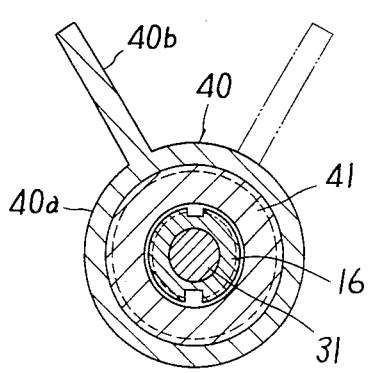
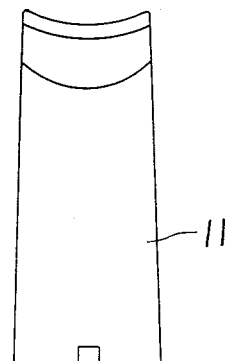
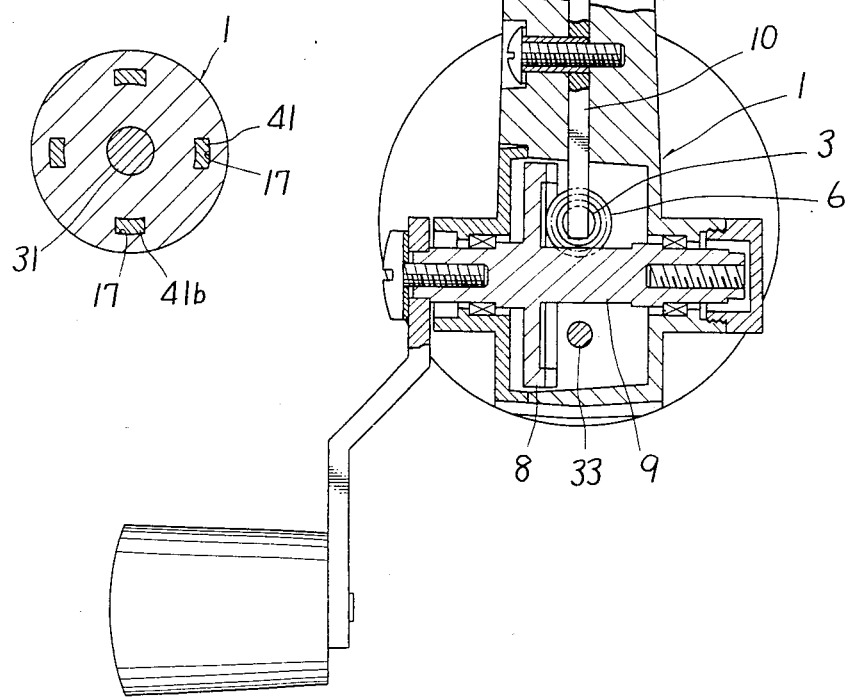

DRAG ADJUSTING DEVICE FOR A CLOSED FACE TYPE FISHING REEL

FIELD OF THE INVENTION

The present invention relates to a drag adjusting device for a closed face type fishing reel.

A closed face type fishing reel has a rotary shaft supported slidably relative to the reel body with the rotary shaft being rotatable in association with a handle shaft. A cup-like-shaped rotary member is mounted on the rotary shaft, and a spool is supported at the front of the reel body. The front of the reel body is provided with a cover for covering the rotary member and spool. The drag adjusting device serves to apply a braking effect against rotation of the spool.

BACKGROUND OF THE INVENTION

The well known conventional closed face type fishing reel employs a drag adjusting device including a drag brake member between the spool and the reel body. The drag brake member which is brought into press-contact with the spool to thereby apply a braking effect against rotation thereof.

The drag adjusting device, as disclosed in, for example, Japanese Utility Model Laid-Open Gazette No. Sho 58-152,875, screwably mounts an operating lever for the drag brake member on the reel body. A drag thumbscrew rotatably controllable from the exterior is supported to the rear portion of the reel body and is associated with the operating lever.

The drag adjusting device, in which the drag thumbscrew is rotatable by the angler's fingers so as to forwardly or backwardly screw the operating lever for adjusting the braking effect of the drag brake member, is very inferior in operability when the braking effect is adjusted corresponding to a pull of a hooked fish, whereby quick adjustment is difficult.

As a result, a problem is created in that the delayed adjustment enables the hooked fish to escape or results in a cut of the fishing line.

SUMMARY OF THE INVENTION

An object of the present invention is to provide a drag adjusting device which can preapply a predetermined braking effect against rotation of the spool to thereby prevent the braking effect from decreasing, and adjust the braking effect quickly and easily during fishing.

The present invention is characterized in that the closed face type fishing reel is provided with a drag adjusting device comprising, (a) a drag brake member for applying a braking effect against rotation of the spool, (b) a drag thumbscrew screwably mounted on the rear portion of the reel body so as to set an initial load of the drag brake member, (c) a transmitting means for transmitting operation of the drag thumbscrew to the drag brake member and provided with a movable member movable in a predetermined range with respect to the drag thumbscrew, (d) a drag lever for adjusting the initial load set by the drag thumbscrew, and (e) an actuator for transmitting operation of the drag lever to the movable member so as to move the movable member with respect to the drag thumbscrew.

The drag adjusting device of the present invention sets the initial load of the drag brake member by previously rotating the drag thumbscrew, thereby exerting the braking effect against rotation of the spool. In such condition, the drag lever can be operated to quickly adjust the initial load, in other words, the braking effect, corresponding to a pull of a hooked fish.

The drag lever positioned at the rear portion of the reel body is constructed to be operable easily by an angler's finger. Therefore, the drag adjusting device of the invention can prevent the braking effect applied to the spool from excessively decreasing and adjust the braking effect easily corresponding to a pull of the hooked fish, thereby enabling the fish to be quickly and smoothly brought in.

The above and other objects and novel features of the invention will be more fully apparent from the following detailed description when the same is read in connection with the accompanying drawings.

BRIEF DESCRIPTION OF THE DRAWINGS

FIG. 2 is a sectional view taken on the line II—II in FIG. 1, FIG. 3 is a sectional view taken on the line III—III in FIG. 1, and FIG. 4 is a longitudinal sectional rear view taken at the position of a handle shaft.

DETAILED DESCRIPTION OF THE INVENTION

Figure 1:
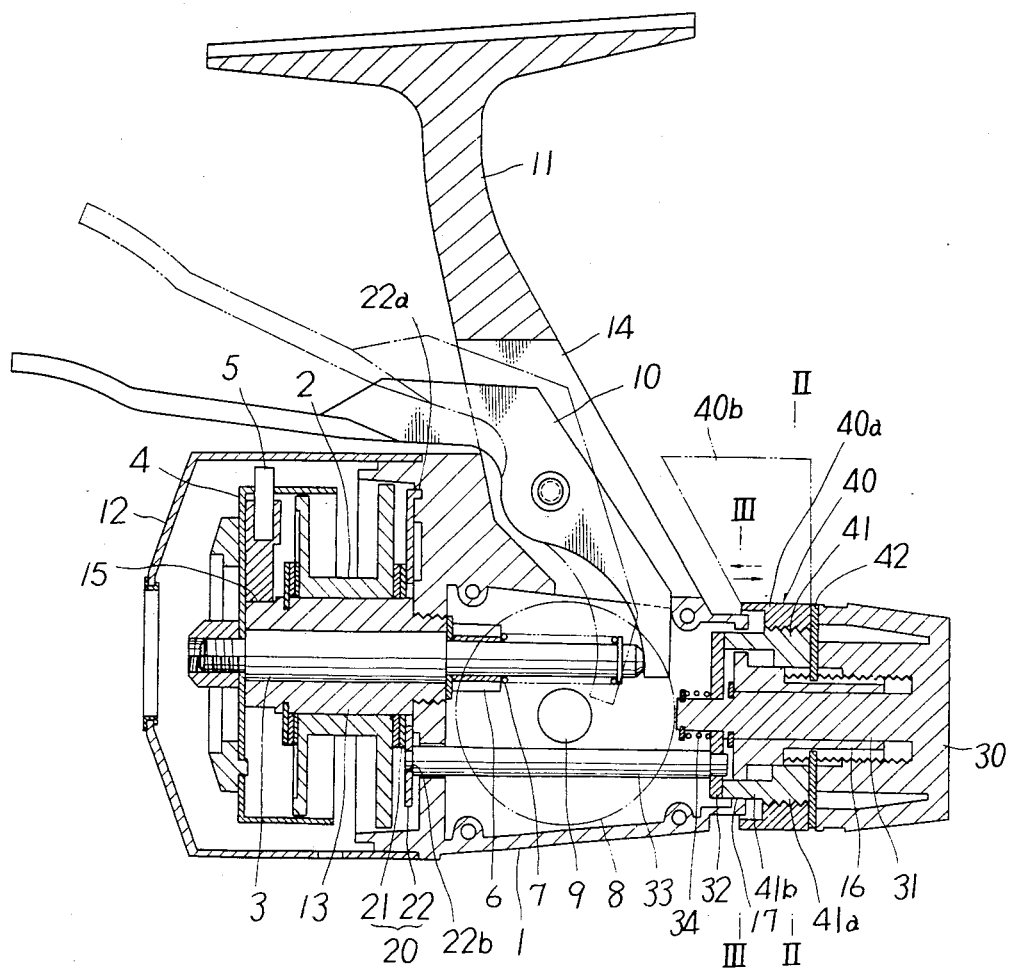
FIG. 1 is a longitudinal sectional side view of an embodiment of a drag adjusting device of the invention applied to a closed face type fishing reel.

Referring to FIGS. 1 and 4, a closed face type fishing reel according to the invention is shown. Reel body 1 is hollow and has a mounting leg 11 at its upper portion, and a cup-like spool cover 12 at its front portion. Tubular shaft 13 is mounted on the front of the reel body 1 and rotatably supports a spool 2 at the outer periphery of the tubular shaft 13. A rotary shaft 3 is inserted into a center bore of the tubular shaft 13 to be rotatable and axially slidable therein. A cup-like rotary member 4 having an annular edge is mounted on the utmost end of the rotaty shaft 3; and a pawl 5 to catch a fishing line drawn out of the spool 2 and wind it onto the spool 2 is provided at the rotary member 4 to project or retract radially thereof. The rotary shaft 3 supports a pinion 6 axially slidably on a part of the rotary shaft 3 which enters into the reel body 1. Between the pinion 6 and the rotary shaft 3 is interposed a return spring 7 for biasing the rotary shaft 3 rearwardly of the reel body 1. Also, the reel body 1 carries at one lateral side thereof a handle shaft 9 having a master gear 8 engageable with the pinion 6. Reel body 1 also has at the root of mounting leg 11 a lever insertion bore 14 open within the reel body 1, and pivotally supports within the lever insertion bore 14 an operating lever 10 having a finger plate extending forwardly of the reel body 1. The other end of operating lever 10 enters into the reel body 1 so as to abut against the end face of the rotary shaft 3, and is operated to move the rotary shaft 3 and rotary member 4 forwardly of the reel body 1 so as to retract the pawl 5 into the cup-like rotary member 4, thereby releasing the fishing line from the pawl 5. The handle 9 is operated to rotate the rotary shaft 3 and cup-like rotary member 4 to thereby cause pawl 5 to project outwardly from the rotary member 4 and catch the fishing line to be wound on the spool 2. In addition, at the outer periphery of the end portion of tubular shaft 13 is provided a cam means 15 having a round surface eccentric with respect to the axis of the tubular shaft 13, a high portion farthest from the axis and level with the outer periphery of tubular shaft 13, and a low portion symmetrical with the high portion and closest to the axis. The rotary member 4 moves forwardly of the reel body 1, and the pawl 5 falls into the low portion of the cam 15 to retract within the rotary member 4. In this state, the rotary member 4 rotates to raise the pawl 5 onto the high portion of cam 15 and to cause it to project outwardly from the rotary member 4.

In the embodiment of the drag adjusting device for the closed-face type fishing reel of the invention shown in FIGS. 1 to 4, a drag brake member 20 is provided between the rear surface of the spool 2 and the front of the reel body 1 such that it is movable axially of the spool 2. A support cylinder 16 projects rearwardly from the periphery of a through bore formed at the rear wall of the reel body 1. A drag thumbscrew 30 for setting an initial load of the drag brake member 20 is screwed with the outer periphery of the utmost end of support cylinder 16, and a drag lever 40 for adjusting the initial load set by the thumbscrew 30 is supported rotatably on the outer periphery of the root of support cylinder 16 through an actuator 41.

In greater detail, the drag brake member 20 comprises two smaller diameter brake plates 21 and one larger diameter brake plate 22 which is curved in an axial direction. Each smaller diameter brake plate 21 is supported axially slidably only on the outer periphery of one end of the tubular shaft 13. Larger diameter brake plate 22 comprises an elastic plate and has at one radial side of its outer periphery a leg 22a supported in a recess provided at the front surface of reel body 1 and at its other radial side an insertion bore 22b.

The drag thumbscrew 30 is cup-like-shaped and has a threaded bore with which the support cylinder 16 screws.

Also, the drag thumbscrew 30 is provided at the center of its inner bottom surface with a support shaft 31 projecting integrally therefrom. Support shaft 31 is inserted through the support cylinder 16 and supports at a part thereof which enters into the reel body 1 a movable member 32 to be axially movable in a predetermined range. The movable member 32 carries at an eccentric portion thereof a transmitting shaft 33 engageable with the insertion bore 22b at the larger diameter brake plate 22, so as to constitute a transmitting means which transmits operation of the drag thumbscrew 30 to the drag brake member 20 through the movable member 32 and transmitting shaft 33.

The drag lever 40 comprises a boss 40a having a threaded bore and a contact surface abutting against the end face of the drag thumbscrew 30, and a lever 40b extending radially outwardly from the outer periphery of boss 40a, the boss 40a screwing with the outer periphery of the actuator 41.

The actuator 41 comprises a cylinder 41a having at its center a through bore and at its outer periphery a screw thread, and a plurality of arms 41b extending from one end face of the cylinder 41a. Cylinder 41a is supported the outer periphery of the root of support cylinder 16. Arms 41b are inserted into insertion bores 17 provided at the rear wall of reel body 1 and abutting at the utmost ends against the lateral surface of the movable member 32 respectively, so that the operation of drag lever 40 is transmitted to the drag brake member 20 through the actuator 41, movable member 32 and transmitting shaft 33.

Between the drag thumbscrew 30 and the drag lever 40 is interposed a lock plate 42 to prevent the drag lever 40 from rotating together with the drag thumbscrew 30. In addition, the lock plate 42 is supported non-rotatably but axially movably with respect to the support cylinder 16. Support cylinder 16 is provided at the screw thread on its outer periphery with axially extending splines, and the lock plate 42 has at its inner periphery projections engageable with the splines respectively.

The movable member 32 is supported rotatably and axially movably onto the support shaft 31, and between the movable member 32 and the end of support shaft 31 is provided a spring 34 which biases the movable member 32 in a direction to release the braking effect of drag brake member 20.

When the fishing reel constructed as described above is used for fishing, the drag thumbscrew 30 is first rotated to set an initial load of the drag brake member 20 prior to beginning to fish. In other words, the drag thumbscrew 30 screws forwardly to move by its thrust the movable member 32 and transmitting shaft 33 axially forwardly and the drag member 20 comes into press-contact with the spool 2 to thereby apply against rotation thereof a desired braking effect. In this case, the actuator 41 and drag lever 40 follow the movement of drag thumbscrew 30 whereby the actuator 41 axially moves while its arms 41b abut against the movable member 32. When the drag thumbscrew 30 is screwed backwardly from the above condition, the movable member 32 and transmitting shaft 33 move axially backwardly, thereby reducing the braking effect applied against spool 2. In this case, a restoring force of the brake plate 22 may be used to move the movable member 32 and transmitting shaft 33 axially backwardly.

In a case where the fishing line is pulled by a hooked fish after the aforesaid initial load has been set, the drag lever 40 is operated to adjust the initial load of drag brake member 20 set by the drag thumbscrew 30. The adjustment of the initial load is carried out in such a manner that the drag lever 40 is rotated clockwise in FIG. 2 and screws forwardly in the direction of the solid arrow in FIG. 1, whereby the actuator 41 moves in the direction of the dotted line arrow, and the movable member 32 and transmitting shaft 33 move axially forwardly to increase a press-contact force of the drag brake member 20 to be applied on the spool 2, thereby increasing the braking effect on the spool 2 more than that set by the drag thumbscrew 30.

In a condition where the actuator 41 moves axially forwardly to create a gap between the actuator 41 and the drag thumbscrew 30, when the drag lever 40 is operated counterclockwise in FIG. 2, the actuator 41 moves axially backwardly, thereby enabling the braking effect to be reduced.

As seen from the above, since the rotation of spool 2 is always subjected to the initial load set by the drag thumbscrew 30, the braking effect to be adjusted corresponding to a pull of the hooked fish can be prevented from decreasing excessively. Also, the drag lever 40 can be operated simply by the angler's finger.

In addition, a transmitting means other than the transmitting shaft 33 and actuator 41 may alternatively be used to transmit the operation of drag thumbscrew 30 to the drag brake member 20 and that of drag lever 40 thereto.

Alternatively, a cam means may be used to move the actuator.

While an embodiment of the invention has been shown and described, the invention is not limited to the specific construction thereof, the embodiment described in the specification is merely exemplary and the scope of the invention is not limited therto.

What is claimed is:

1. A drag adjusting device for a fishing reel including a reel body and a spool supported rotatably to a front portion of said reel body, said drag adjusting device comprising,
   (a) a drag brake member for applying a braking effect against rotation of said spool,
   (b) a drag thumbscrew screwably mounted on a rear portion of said reel body for setting an initial load of said drag brake member,
   (c) a transmitting means for transmitting operation of said drag thumbscrew to said drag brake member, said transmitting means being provided with a movable member axially movable in a predetermined range with respect to said drag thumbscrew,
   (d) a drag lever for adjusting the initial load set by said drag thumbscrew, and
   (e) an actuator which transmits operation of said drag lever to said movable member to thereby axially move said movable member with respect to said drag thumbscrew, wherein said drag thumbscrew is provided with a support shaft, and said support shaft supports said movable member rotatably in a predetermined range and is provided with means for biasing said movable member in a direction to release the braking effect of said drag brake member.

2. A drag adjusting device according to claim 1, wherein said reel body is provided with a rear wall and a support cylinder extending rearwardly from said rear wall, said drag thumbscrew is screwably mounted on an outer periphery of said support cylinder, said support shaft at said thumbscrew is fitted axially movably into a central portion of said support cylinder and passes through said rear wall to enter into an interior region of said reel body, and said movable member is supported onto said projection of said support shaft to be axially movable in a predetermined range.

3. A drag adjusting device according to claim 2, wherein said actuator is interposed between the rear wall of said reel body and said drag thumbscrew and supported axially movably onto the outer periphery of said support cylinder, and said actuator has arms passing through said rear wall to contact said movable member to prevent rotation of said actuator.

4. A drag adjusting device according to claim 3, wherein said actuator is cylindrical and has at its outer periphery a screw thread and said drag lever comprises means for screwing with said screw thread.

5. A drag adjusting device according to claim 4, wherein a lock plate is interposed between said drag lever and said drag thumbscrew, and said lock plate, responsive to rotation of said drag lever, operates to cut off an operating force to be transmitted from said drag lever to said drag thumbscrew.

* * * * *